HECTOGRAPHIC DUPLICATING MACHINES

Original Filed Dec. 19, 1957 4 Sheets-Sheet 1

INVENTOR

FRANCOIS RODOLPHE BONSCH

BY Irvin S. Thompson

ATTY.

HECTOGRAPHIC DUPLICATING MACHINES

Original Filed Dec. 19, 1957 4 Sheets-Sheet 2

INVENTOR

FRANCOIS RODOLPHE BONSCH

BY Irwin S. Thompson

ATTY.

HECTOGRAPHIC DUPLICATING MACHINES

Original Filed Dec. 19, 1957 4 Sheets-Sheet 3

INVENTOR
FRANCOIS RODOLPHE BONSCH
BY Irwin S. Thompson
ATTY.

HECTOGRAPHIC DUPLICATING MACHINES

Original Filed Dec. 19, 1957 4 Sheets-Sheet 4

INVENTOR

FRANCOIS RODOLPHE BONSCH

BY Irwin S. Thompson ATTY.

United States Patent Office

Re. 26,112
Reissued Nov. 8, 1966

26,112

HECTOGRAPHIC DUPLICATING MACHINES

Francois Rodolphe Bonsch, Paris, France, assignor to Block & Anderson Limited, London, England, a British company Original No. 2,980,014, dated Apr. 18, 1961, Ser. No. 703,973, Dec. 19, 1957. Application for reissue Oct. 9, 1961, Ser. No. 144,288
Claims priority, application Great Britain Dec. 28, 1956
15 Claims. (Cl. 101—91)

Matter enclosed in heavy brackets [ ] appears in the original patent but forms no part of this reissue specification; matter printed in italics indicates the additions made by reissue.

The present invention relates to hectographic duplicating machines and more particularly to machines of the rotary drum type adapted to take copies of selected items from the hectographic master sheet carried by the printing drum.

Machines of the type above referred to usually comprise a printing couple consisting of a rotatable printing drum and a counterpressure roller mounted with its axis parallel to that of the drum, the hectographic master sheet being held wrapped round the surface of the printing drum and the copy sheets being fed to the nip between the printing drum and the counterpressure roller after the surface of the copy sheet which is to contact the master sheet has been moistened by a solvent for the hectographic ink of the master.

A need has already been demonstrated for effecting selective duplicating with machines of this type. For example, in production control systems for use in industry it is often necessary to prepare a number of copies each bearing a common heading and a selected one or more of a number of separate items carried on the master sheet in addition to the aforesaid common heading. The selected item or items may be at a random positioning among the group of items on the master sheet and the desired form of the resultant copy is that having the common heading at the top of the sheet followed by each of the selected items at regularly spaced intervals thereunder.

It is a general object of this invention to provide a machine embodying improved means whereby selective coyping either of a random selection or of a consecutive selection of the items of the master sheet may be carried out simply and expeditiously.

According to the broadest aspect of the present invention a hectographic duplicating machine of the type which includes a rotatable printing drum adapted to carry the hectographic master sheet with its lines of text lying parallel with the axis of the drum, is so constructed that the working peripheral surface of such drum includes an arcuate region which is sub-divided into a number of separate segments each of which is individually displaceable in a radial direction relative to the drum axis between the printing position and an inoperative position which is nearer to the drum axis than said printing position.

In a preferred embodiment according to the invention, the normal position of each of the said separate segments is that of the aforesaid inward or inoperative position, at which position they lie with their respective peripheral printing surfaces at a common radial distance from the drum axis, and means are provided for individually displacing each of said separate segments radially outwards to the printing position at which the centre of the peripheral printing surface of each displaced segment lies at a predetermined second radial distance from the drum axis which is greater than the first radial distance and which is equal to the radius of the undivided region of the drum surface. By making the circumferential arcuate spacing distance between the centres of adjacent printing segments equal to the line spacing dimension of the master copy sheet text, any desired one or any desired selection of the separate text lines of the master sheet may be selectively copied by displacing the related printing segments to the outward or printing position while leaving the segments related to the unwanted text lines at their inward or inoperative positions.

During each printing operation effected by rotation of the printing drum, the copy sheet is advanced by its gripping engagement in the nip between the printing drum and the counterpressure roller but, owing to the reduced radial dimension of those segments of the drum which are in their inoperative position, the copy sheet is not subjected to any appreciable advancing movement while such segments are opposite the counterpressure roller in view of the virtual absence of any gripping pressure thereon so that the copy sheet is effectively advanced only by each printing segment which is in the printing position and then by a distance corresponding to the arcuate circumferential width of the printing segment or of the plurality of segments if two or more consecutive segments are in use. The copy sheet accordingly remains substantially stationary during the periods when the inoperative printing segments are passing the counterpressure roller so that the selected text lines are printed at a uniform spacing distance apart beneath the common heading of the master sheet in spite of the fact that various selected text lines of the master sheet are themselves irregularly spaced with respect to one another.

Although the effective displacement of each printing segment is required to be in a radial direction with respect to the drum axis, such movement is conveniently achieved through the intermediary of a compound motion which is partly radial and partly axial in direction and according to a further feature of the invention manually operable control means are provided for placing each individual printing segment or any number of printing segments into the printing position by means of such compound movement.

The invention further comprises control means, which may be either manually or automatically operated, for moving in turn, during successive revolutions of the printing drum, each printing segment or any desired combination of consecutive printing segments into the printing position to effect the copying of single text line items or groups of text line items in sequence upon successive copy sheets applied to the machine. The manually operable control means may further include or be combined with means for locking any selected printing segment or combination of printing segments in the printing position so as to facilitate "repeat" copying from such combination.

In order that the nature of the invention may be more readily understood a practical embodiment thereof will now be described in greater detail but by way of illustrative example only with reference to the accompanying drawings in which.

Figure 1:
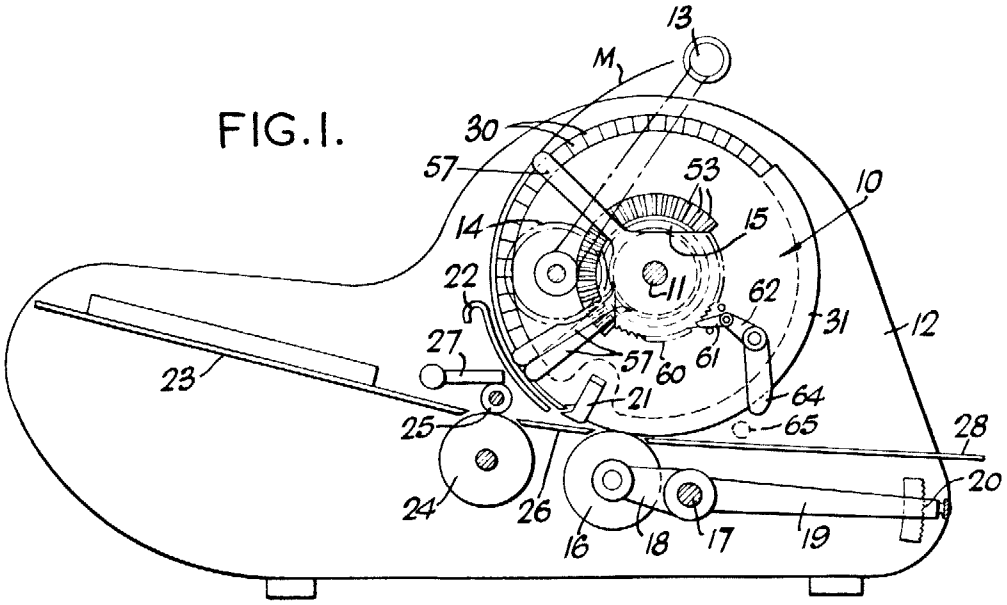
FIGURE 1 is a sectional side elevational view of a typical known form of rotary duplicating machine having the present invention embodied therein.
Figure 2:
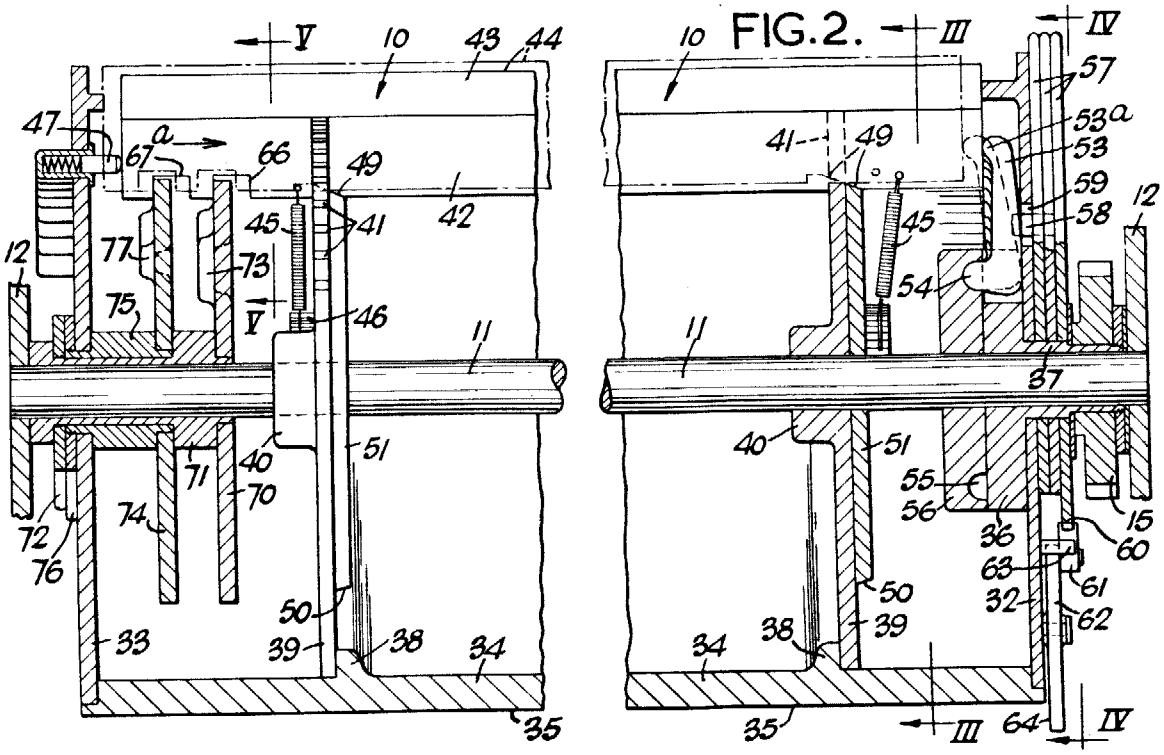
FIGURE 2 is a longitudinal section through the axis of the printing drum shown in FIG. 1, drawn to an enlarged scale.
Figure 3:
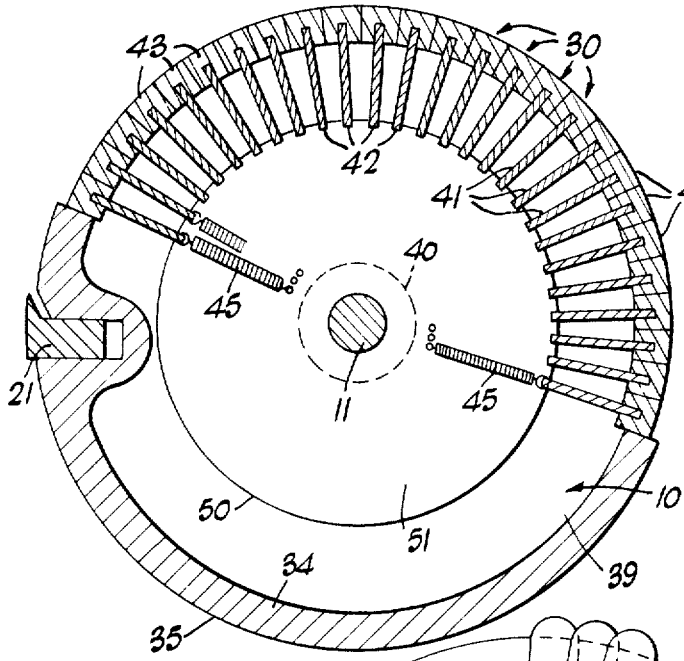
FIGURE 3 is a transverse cross-section taken on the line III—III of FIG. 2.
Figure 4:
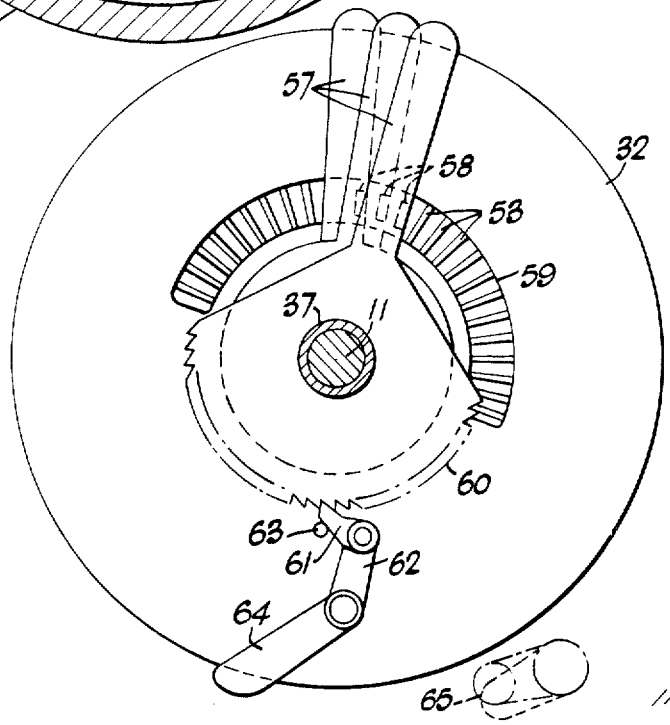
FIGURE 4 is a transverse cross-section taken on the line IV—IV of FIG. 2.
Figure 5:
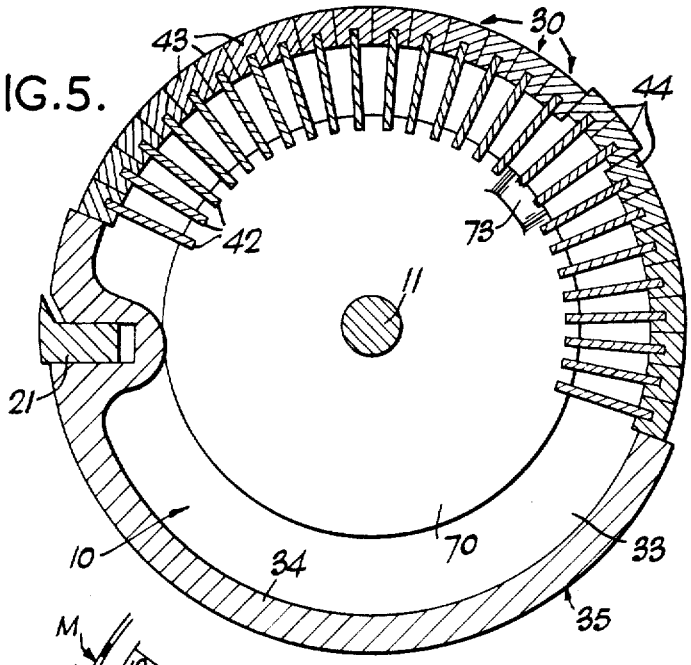
FIGURE 5 is a further fragmentary cross-section on the line V—V of FIG. 2.

The invention will be described as applied to a simple hand-driven duplicating machine and as shown in FIG. 1 this comprises a cylindrical printing drum 10 mounted for rotation about the substantially horizontal and stationary axle 11 secured between opposed vertical side plates 12 forming part of the stationary framework of the machine. The drum 10 is rotated, one revolution for each machine operation, by means of a hand-operated crank arm 13 through meshing gear wheels 14 and 15, the gear wheel 15 being rigidly connected to the printing drum and the gear wheel 14 being coupled to the crank arm 13 and journalled in one of the side plates 12.

The printing drum co-operates with a counter-pressure roller 16 which is journalled for rotation between the side plates 12 about an axis parallel with that of the drum 10 at a position, in the example shown, almost vertically beneath the drum axle 11. This counterpressure roller 16 forms a printing couple in conjunction with the printing drum 10 and is provided with means for varying the printing pressure exerted between it and the drum. As shown, such means comprises a horizontal shaft 17 journalled in the side plates 12 and provided with a pair of rigidly connected spaced arms 18 having the counterpressure roller 16 journalled in their free ends. A lever arm 19 also rigidly connected to the shaft 17 is provided at its outer end with means 20 for securing it in any one of a number of angular settings relative to the machine framework.

The master sheet, indicated at M, is secured to the printing drum 10 by gripping its upper edge within the clip shown at 21 and comprising, in known manner, a radially movable bar having a chamfered clamping edge and slidable within a correspondingly shaped radial slot in the printing drum. Such clip 21 is operated by mechanism, not shown, of any suitabe known form so as to be capable of being opened when the drum 10 is in the position as indicated to receive the edge of the master sheet M inserted in the channel formed between the outer surface of the drum and an arcuate guide plate 22 secured between the side plates 12. Closure of the clip 21 secures such forward edge in known manner whereby the master sheet becomes wrapped around the printing drum 10 upon its rotation.

Copy sheets are received upon the feed plate 23 also secured between the side plates 12, the forward edge of the copy sheet entering the bight between opposed sheet feeding and moistening rollers 24, 25 respectively which are also journalled in the side plates 12.

These rollers 24, 25 are arranged to be driven intermittently in well known manner from the printing drum crank arm 13, e.g. through an oscillating gear sector and a unidirectional drive device, whereby they are positively rotated for a brief period at the commencement of and in timed relationship to each revolution of the drum 10. By such rotation each applied copy sheet is fed forwardly over the support plate 26 to the operative nip between the printing drum 10 and the counterpressure roller 16. The duration and timing of the positive drive imparted to the rollers 24, 25 is such as to advance the copy sheet from the initial laying-on position to that at which the forward edge of the copy sheet is gripped by the printing couple just after the clip 21 has passed the counterpressure roller 16. Thereafter further forward movement of the copy sheet is effected only by the grip exerted thereon in the nip of the printing couple. Moistening of the copy sheet is effected, in the example shown, by moistening fluid applied through a pad 27 resting upon the upper surface region of the roller 25 whereby it becomes transferred to the upper surface of the copy sheet immediately prior to the entry of the sheet into the nip of the printing couple where such moistened surface comes in contact with the image-bearing surface of the master sheet M.

After passing through the printing couple the copy sheet is delivered to the delivery tray 28.

Whereas in the machines of the prior art, the drum 10 is normally arranged to have a smooth cylindrical peripheral working surface of constant radius and unbroken except for the master clamping clip 21, in the machine according to the invention an arcuate region of such surface, for example, approximately 180°, is subdivided into a number of separate printing segments 30 each of which is arranged to be individually displaceable in a radial direction with respect to the drum axis between an inner position, where the radial distance between the peripheral printing surface thereof and the drum axis is less than the radius of the remaining undivided region 31 of the drum surface, and an outer or printing position where such radial distance is equal to the radius of the undivided region 31. Means, as described later, are provided for controlling the position of each printing segment whereby it may be placed in one or other of the two positions for the whole of one or more revolutions of the drum.

Figure 6:
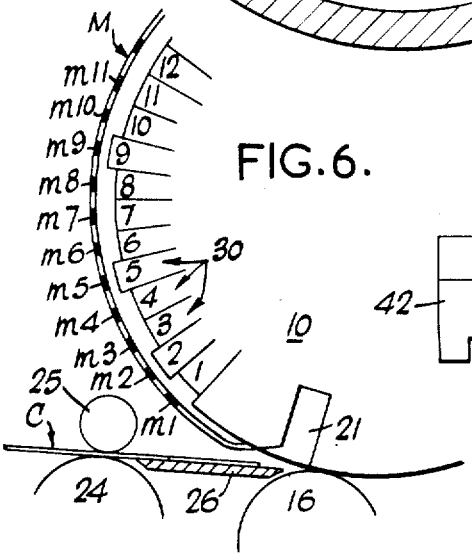
FIGURE 6 is a diagrammatic view illustrating the manner of operation.

The manner of operation of the machine with such an arrangement of separate printing segments is best explained with reference to the diagram of FIG. 6. The master sheet M, held by its upper (sheet) edge on the clip 21 is provided with a plurality of separate lines of text m1, m2, m3 . . . m10, m11 . . . disposed to lie parallel with the drum axis. The spacing between each of these lines is arranged to be equal to the arcuate spacing distance between the centers of adjacent printing segments while the text lines themselves are arranged to register one with each segment. It will be assumed that, as shown, the printing segments numbered 2, 5 and 9 have been moved to the outward, printing position whereas the remaining segments are at the inward, inoperative position.

The copy sheet C, fed forwardly by the rollers 24 and 25 enters the nip between drum 10 and counterpressure roller 16 just behind the clip 21 so that the master sheet M and the copy sheet C are fed forwardly in unison until the printing segment 1 comes opposite the counterpressure roller 16. Owing to the inward positioning of such printing segment, there is now no pressure by the roller 16 upon the drum 10 and in consequence the forward movement of the copy sheet is arrested and printing of the text line m1 is not effected. Upon arrival of the next and operative printing segment 2, however, pressure by the roller 16 again takes place with resultant printing of text line m2 accompanied by forward movement of the copy sheet C by an amount determined by the arcuate width of the segment. In similar manner, printing of text lines m3 and m4 is omitted and no further forward movement of the copy sheet C occurs until the arrival of printing segment 5 which, being in printing position, prints the text line m5 immediately beneath the previously printed text line m2 on the copy sheet C while simultaneously moving the latter forward by the amount of one line space. Further printing does not occur until the arrival of printing segment 9 which causes printing of text line m9 immediately beneath the previously printed line m5. Assuming no further printing segments are in operative position, the final delivery movement of the copy sheet C is effected when the remainder of the undivided region 31 of the drum 10 comes opposite the counterpressure roller 16 towards the end of the operative revolution of the drum.

The form of the drum and of the various means associated therewith for controlling the position of the printing segments will now be described in greater detail with reference to FIGS. 2–5 and 7.

The drum 10 comprises opposite end plate 32, 33 which are each secured to an arcuate or part-cylindrical member 34, the outer peripheral surface 35 of which constitutes the undivided region 31 of the working surface of the drum. This member 34 conveniently extends around approximately 180° of the drum circumference. To the inner surface of the end plate 32 is secured a bushing 36 having an outwardly directed integral sleeve 37 adapted to form a bearing for one end of the drum upon the stationary axle 11.

Secured to inwardly directed ribs 38 of the member 34, at spaced-apart positions disposed inwardly of the drum, are further web plates 39 provided with central bearing bushings 40 also rotatable upon the stationary axle 11. These web plates 39, over their peripheral region not covered by the member 34, are radially slotted as shown at 41, more particularly in FIG. 3, the respective slots of the two web plates being in axial alignment. Mounted in each pair of aligned slots 41 is the web 42 of a printing segment 30, such web being substantially thinner than the arcuate width of the head portion 43 whose curved outer surface 44 constitutes the working surface of the segment. Such printing segments are accordingly displaceable within the radial slots 41 in both an axial direction and in a radial direction. Tension springs 45 extending between the inner edge of the web 42 of each segment and securing means, such as a projecting pin 46 on the associated web plate 39, serve to retain each printing segment in position.

The opposite end plate 33 is provided with a number of spring plungers 47, one in alignment with each of the webs 42 of the printing segments 30. Such plungers each operate to urge the associated printing segment in the direction of the arrow a.

Figure 7:
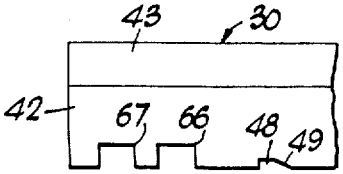
FIGURE 7 is a fragmentary detail view.

As shown more clearly in the detail FIG. 7, the inwardly directed edge of the web 42 of each printing segment is provided with a pair of spaced notches 48 positioned to co-operate with the web plates 39. One side of each notch is of chamfered or ramped form indicated at 49 and these ramped regions co-operate respectively with the chamfered edge 50 of two discs 51 secured one to each of the two web plates 39 whereby, if any printing segment 30 is urged in an axial direction opposite to that of the arrow a the ramped surfaces 49 ride up the chamfered edge 50 of the discs 51 and thereby, by a compound axial and radial movement of the printing segment, effect a radial displacement of such segment which brings the peripheral working surface 44 thereof to the outer or operative position where the radial distance between said working surface 44 and the axis of the drum is equal to the radial dimension of the working surface 35 of the member 34.

For the purpose of selectively moving any printing segment 30 there are provided a plurality of operating fingers 53, one for each segment 30, at the end of the drum opposite to the plungers 47. These fingers 53 are each located within an individual radial slot in the bushing 36 and have rounded nose ends 54 which form fulcrum points therefor and which are located in a semicircular section channel 55 formed on one radial face of a further collar 56 which is rigidly secured to the inner surface of the end bushing 36. The opposite, outer end of each finger 53 is provided with a projection 53a adapted to engage the end of the associated web 42.

Disposed to rotate around the sleeve 37 of the bushing 36 on the outside of the end plate 32 are a number of separate setting or control levers 57 each of which is provided with an axially directed projection 58 adapted to pass through an arcuate slot 59 in the end plate 32 and, according to the setting position of the lever, to engage and rock a chosen one of the fingers 53 about its fulcrum end 54.

When thus engaged and rocked the selected finger 53 applies the required axial force to the associated printing segment 30 to cause movement thereof from its normal inoperative position to its operative or printing position. The amount of axial movement is preferably such that the axially directed edge surface of the web 42 rests upon the similar axially directed surfaces at the bottom of the slots 41 thereby to prevent any axially directed reactive forces upon the segment when printing pressure is applied thereto by the counterpressure roller 16.

The two inner control levers 57 are shown arranged for purely manual setting prior to each operation of the machine but the third and outermost lever 57 is shown also adapted for automatic alteration by one step at the end of each operative revolution of the printing drum. Such means comprise the formation of the hub of the lever with an enlarged ratchet-toothed sector 60 around its outer edge. These ratchet teeth are engaged by a pawl 61 carried upon a rocking lever arm 62 pivotally mounted on the end plate 32 and co-operating with a locking pin 63. The lever arm 62 is spring-urged, by means not shown, to the position indicated in FIG. 4 while the outer end of the interconnected arm 64 is adapted to come into engagement, at the end of each revolution of the drum 10, with a stationary abutment 65 carried on the adjacent side plate 12 whereby the lever arm 62 is rocked to shift the sector 60 by the amount of one tooth. This movement alters the setting position of the associated control lever 57 by the amount of the angular spacing between adjacent operating fingers 53.

By means of the above-described arrangement of operating fingers 53 and control levers 57 any chosen two text lines of the master can be pre-selected as a constant heading and each of the further text lines automatically selected for operative use in turn during successive revolutions of the printing drum. If a facility for using a greater number of heading lines is desired the number of manually set control levers may obviously be increased while, if desired, the angular extent of the projections 58 carried by one or more of the control levers 57 can be increased to rock two or more of the operating fingers 53 simultaneously. The abutment 65 is conveniently mounted upon a rocker arm connected to a manual control member whereby it can be moved out of the path of the arm 64 when automatic change of the operative printing segment is not required.

At the opposite end of the drum there are illustrated alternative means for controlling the selection and displacement of the printing segments into operative position. These means comprise the formation of additional notches 66, 67 in each of the webs 42. The notch 66 co-operates with a first rotatable disc 70 fixed to the inner end of a tubular bushing 71 rotatable on the fixed axle 11. The opposite end of this bushing, on the outer side of the end plate 33 has secured thereto a control lever 72 which may resemble the levers 57. Over a predetermined arc the peripheral region of the disc 70 is provided with either a contoured rail or, as shown, an integral offset region 73 adapted to form a ramp or cam surface of effective length embracing a chosen number say two, of the webs 42 of the printing segments 30. Such ramp region 73 acts upon the radial edge surface of the notches 66 with which it is in register to displace the associated printing segments 30 in an axial direction and thereby to produce an accompanying radial outward movement by reason of the ramp surfaces 49 and chamfered edges 50 of the discs 51. By appropriate angular setting of the control lever 72 any desired two adjacent printing segments may be displaced to the operative position. A second generally similar disc 74, connected by way of bushing 75 to a control lever 76, has a ramp region 77 extending over only one web 42. This disc co-operates with the notch 67 and provides for movement of the printing segments singly. It will be understood that the ramp regions such as 73 and 77 may be of any desired arcuate length so as simultaneously to control any desired number of printing segments. It is also possible to employ a disc having a ramp surface extending over the entire arcuate length occupied by printing segments, e.g. 180° in the example shown. By appropriate positioning of such a disc either the first or last segment alone may be displaced or any desired consecutive number of printing segments including such first or last segment. If desired the control levers 72, 76 may be provided with means similar to the toothed sector 60 on lever 57 and its associated parts, for effecting automatic progression of the operative printing segments during successive revolutions of the printing drum.

Various modifications may clearly be made without departing from the scope of the invention. For example, although the invention has been described in connection with a manually operated machine, it is clearly equally applicable to a power driven machine. The separate printing elements into which a part of the drum is subdivided have been referred to as segments but it is to be understood that this term does not restrict the cross-sectional form to that shown. Other cross-sections may obviously be used. The various control levers, such as shown at 57, may be arranged to operate directly upon the printing segments instead of through the intermediary of operating fingers while in another possible modification each segment has an individual setting control member associated therewith in the form of an aligned and radially movable press button. Although in the example described the arcuate width of each segment is arranged to be equal to the line spacing distance of the master sheet it is possible to employ the other widths, for instance, equal to an integral multiple or a vulgar fraction of the line spacing distance.

I claim:

1. A hectographic duplicating machine including a printing and copy-sheet feeding couple comprising a rotatable printing drum and a counterpressure roller mounted for rotation on an axis parallel to but spaced from the axis of said drum, said drum including means for securing an image-bearing member thereto and wrapped at least partially therearound with its respective lines of image text directed parallel to the axis of said drum, a plurality of similar printing segments disposed parallel with said drum axis and forming that part of the peripheral surface of said drum which underlies the image-bearing portion of said image-bearing member, said segments each having a circumferential width equal to and positioned to underlie and support one text line area of said image-bearing member, means for supporting each segment in a first position in which said segments conjointly form a part-cylindrical supporting surface for said image-bearing member and of a radius less than that necessary to provide printing and copy-sheet feeding pressure at the printing bight between said drum and said counterpressure roller and means for effecting individual displacement of any chosen one of said segments in a radially outward direction to a second position where the peripheral surface thereof provides a part-cylindrical surface having a radius from the drum axis sufficient to effect both printing and copy-sheet feeding movement in conjunction with said counterpressure roller at the printing bight of said printing couple.

2. A hectographic duplicating machine according to claim 1 which includes means for displacing a chosen printing segment or combination of segments prior to commencement of an operative revolution of the printind drum and for retaining such displacement until at least the end of said operative revolution of the drum.

3. A hectographic duplicating machine including a printing and copy-sheet feeding couple comprising a rotatable printing drum and a rotatable counterpressure roller mounted for rotation on an axis parallel to the axis of said drum, said drum including means for securing an image-bearing master sheet therearound with its respective lines of image text directed parallel to the axis of said drum, that part of said drum which underlies the image-text region of said master sheet being constituted by a plurality of separate printing segments of equal circumferential width disposed side-by-side and parallel with said drum axis with each segment positioned to underlie a different one of said image-text lines of said master sheet, said segments normally forming a part-cylindrical surface for supporting the image region of said master sheet at a radius from said drum axis which will not produce either printing of the master image or forward feeding movement of the copy-sheet at the printing bight of said printing couple, and means for effecting individual displacement of any chosen plurality of said segments in a radial direction to an outward printing position where the peripheral surfaces thereof are each at a radius from the axis of said drum appropriate to provide both printing pressure and copy-sheet feeding movement at said printing bight of said printing couple.

4. A hectographic duplicating machine including a printing and copy-sheet feeding couple comprising a rotatable printing drum and a rotatable counterpressure roller mounted for rotation on an axis parallel to the axis of said drum, said drum including means for securing an image-bearing master sheet therearound with its respective lines of image text directed parallel to the axis of said drum, that part of said drum which underlies the image-text region of said master sheet being constituted by a plurality of separate printing segments of equal circumferential width disposed side-by-side and parallel with said drum axis with each segment positioned to underlie a different one of said image-text lines of said master sheet, said segments normally forming a part-cylindrical surface for supporting the image region of said master sheet at a radius from said drum axis which will not produce either printing of the master also or forward feeding movement of the copy-sheet at the printing bight of said printing couple, and means for effecting during successive revolutions of said drum, the individual displacement of each of said segments in turn in a radial direction to an outward printing position where the peripheral surface thereof is at a radius from the axis of said drum appropriate to provide both printing pressure and copy-sheet feeding movement at said printing bight of said printing couple.

5. A hectographic duplicating machine according to claim 1 in which said segment displacement means include individual motion translating means for each segment by which said radial displacement movement is obtained by a compound motion of such segment in both a radial and an axial direction.

6. A hectographic duplicating machine according to claim 5 which includes segment setting means operable to apply an axially directed force to a segment chosen for displacement in a radially outward direction.

7. A hectographic duplicating machine according to claim 6 which includes means slidably mounting each of said segments in said printing drum for movement in a direction parallel with the drum axis, said slidable mounting means including axially spaced inclined surfaces on each segment and co-operating axially spaced inclined surfaces on said drum.

8. A hectographic duplicating machine according to claim 7 which includes at least one displaceable control member carrying an abutment selectively registrable with at least one of said printing segments to apply said axially directed displacement force thereto.

9. A hectographic duplicating machine according to claim 7 which includes a rotatable setting member within said printing drum, said rotatable setting member having a peripheral offset region arranged for engagement with a co-operating abutment surface on each of said segments to apply said axially directed displacement force thereto.

10. A hectographic duplicating machine according to claim 8 in which said control member is arranged to operate upon said segment or group of segments through the intermediary of pivotal operating fingers.

11. A hectographic duplicating machine including a printing and copy-sheet feeding couple comprising a rotatable printing drum and a rotatable counterpressure roller mounted for rotation on an axis parallel to the axis of said drum, said drum including means for securing an image-bearing master sheet therearound with its respective lines of image text directed parallel to the axis of said drum, that part of said drum which underlies the image-text region of said master sheet being constituted by a plurality of separate printing segments of equal circumferential width disposed side-by-side and parallel with said drum axis with each segment positioned to underlie a different one of said image-text lines of said master sheet, said segments normally forming a part-cylindrical surface for supporting the image region of said master sheet at a radius from said drum axis which will not produce either printing of the master image or forward feeding movement of the copy-sheet at the printing bight of said printing couple, and means for effecting during successive revolutions of said drum, the individual displacement of different successive groups of said segments in a radial direction to an outward printing position where the peripheral surfaces thereof are each at a radius from the axis of said drum appropriate to provide both printing pressure and copy-sheet feeding movement at said printing bight of said printing couple.

12. For a hectographic duplicating or like printing machine, a rotatable printing drum which includes a first solid part-cylindrical peripheral wall part having a constant radius from the drum axis and a second part-cylindrical peripheral wall part extending between opposite ends of said first wall part and comprising a plurality of separate axially directed printing segments of equal circumferential width, sheet clamping means in said first wall part for retaining the forward edge of an image-bearing master sheet to be disposed around and supported by said second wall part of said printing drum, a radially disposed web portion extending inwardly from each of said separate printing segments, axially spaced radially slotted guide plates rotatable with said printing drum for supporting said web portions of said printing segments in a manner permitting both axial and radial displacement thereof, ramped surfaces on each of said web portions at axially spaced positions thereof, correspondingly ramped surfaces facing each of said ramped web surfaces and carried by and rotatable with said printing drum, spirng means associated with each of said printing segments for urging said printing segments inwardly to a position where their respective peripheral outer surfaces are at a radius from the axis of said drum less than that of said first wall part, and means for effecting axial displacement of any chosen one of said printing segments to bring said ramped web surfaces into engagement with said opposing ramped surfaces thereby to move the associated web portion and its attached printing segment radially outwards to a position where the outwardly facing peripheral surface of said printing segment lies at a radius from the drum axis equal to said first wall part.

13. For a hectographic duplicating or like printing machine, a rotatable printing drum which includes a first solid part-cylindrical peripheral wall part having a constant radius from the drum axis and a second part-cylindrical peripheral wall part extending between opposite ends of said first wall part and comprising a plurality of separate axially directed printing segments of equal circumferential width, sheet clamping means in said first wall part for retaining the forward edge of an image-bearing master sheet to be disposed around and supported by said second wall part of said printing drum, a radially disposed inwardly directed web portion extending inwardly from each of said separate printing segments, axially spaced radially slotted guide plates rotatable with said printing drum for supporting said web portions of said printing segments in a manner permitting both axial and radial displacement thereof, a plurality of notches each having a ramped surface at one end in each of said web portions at axially spaced positions therein, a plurality of members having correspondingly ramped surfaces facing each of said ramped web surfaces, said members being carried by and rotatable with said printing drum, spring means associated with each of said printing segments for urging said printng segments inwardly to a position where their respective peripheral outer surfaces are at a radius from the axis of said drum less than that of said first wall part, and means for effecting axial displacement of any chosen one of said printing segments to bring said ramped web surfaces into engagement with said opposing ramped surfaces thereby to move the associated web portion and its attached printing segment radially outwards to a position where the outwardly facing peripheral surface of said printing segment lies at a radius from the drum axis equal to said first wall part.

14. For a hectographic duplicating or like printing machine, a rotatable printing drum which includes a first solid part-cylindrical peripheral wall part having a constant radius from the drum axis and a second part-cylindrical peripheral wall part extending between opposite ends of said first wall part and comprising a plurality of separate axially directed printing segments of equal circumferential width, sheet clamping means in said first wall part for retaining the forward edge of an image-bearing master sheet to be disposed around and supported by said second wall part of said printing drum, a radially disposed web portion extending inwardly from each of said separate printing segments, axially spaced radially slotted guide plates rotatable with said printing drum for supporting said web portions of said printing segments in a manner permitting both axial and radial displacement thereof, ramped surfaces on each of said web portions at axially spaced positions thereof, correspondingly ramped surfaces facing each of said ramped web surfaces and carried by and rotatable with said printing drum, spring means associated with each of said printing segments for urging said printing segments inwardly to a position where their respective peripheral outer surfaces are at a radius from the axis of said drum less than that of said first wall part, and means for effecting axial displacement of any chosen plurality of said printing segments to bring said ramped web surfaces thereof into engagement with said opposing ramped surfaces thereby to move each of the associated web portions and their attached printing segments radially outwards to positions where the outwardly facing peripheral surface of each of said printing segments lies at a radius from the drum axis equal to said first wall part.

*15. In a printing machine, in combination, printing roller means having an axis of rotation and including means for holding a printing form having sections for columns or lines of characters extending parallel to said axis and disposed around the periphery of said printing roller means; counter pressure roller means having an axis of rotation parallel to said axis of rotation of said printing roller means and defining with said printing roller means a printing plane passing through said axes of said roller means; a plurality of printing members having a number corresponding to the greatest number of sections to be printed, being elongated in axial direction, disposed about the periphery, and mounted on one of said roller means adjacent each other, said printing members having smooth pressure faces having areas matching corresponding sections of the printing form, each printing member being movable in radial direction between a retracted inoperative position and an advanced printing position defining a printing line with the peripheral surface of the other of said roller means when passing through said printing plane whereby copy sheets supplied to the bight between a printing form on said printing roller means and said counter pressure roller means and passing through said printing line are imprinted only by sections of said printing form located between the respective corresponding pressure faces of said printing members in said print-*

*ing position and the peripheral surface of said other roller means; and control means for selectively moving each of said printing members to and from said printing position thereof for selecting desired sections of said printing form for printing.*

References Cited by the Examiner

The following references, cited by the Examiner, are of record in the patented file of this patent or the original patent.

UNITED STATES PATENTS

| | | | |
|---|---|---|---|
| 469,931 | 3/1892 | Briggs | 101—91 X |
| 867,868 | 10/1907 | Beals | 101—91 X |
| 1,196,729 | 8/1916 | Barroll | 101—91 X |
| 1,744,770 | 1/1930 | Jahn | 101—91 X |
| 2,012,670 | 8/1935 | Mack | 101—91 X |
| 2,421,823 | 6/1947 | Allen et al. | 101—147 |

WILLIAM B. PENN, *Primary Examiner.*